United States Patent
Gomaa et al.

(10) Patent No.: US 10,808,511 B2
(45) Date of Patent: Oct. 20, 2020

(54) METHOD OF ENHANCING THE COMPLEXITY OF A FRACTURE NETWORK WITHIN A SUBTERRANEAN FORMATION

(71) Applicant: Baker Hughes Incorporated, Houston, TX (US)

(72) Inventors: Ahmed M. Gomaa, Tomball, TX (US); Qi Qu, Spring, TX (US); Russell L. Maharidge, Spring, TX (US); Scott G. Nelson, Edmond, OK (US); Ted B. Reed, New Braunfels, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 500 days.

(21) Appl. No.: 14/199,674

(22) Filed: Mar. 6, 2014

(65) Prior Publication Data

US 2014/0251626 A1   Sep. 11, 2014

Related U.S. Application Data

(60) Provisional application No. 61/774,866, filed on Mar. 8, 2013.

(51) Int. Cl.
| | | |
|---|---|---|
| *E21B 43/26* | (2006.01) | |
| *C09K 8/62* | (2006.01) | |
| *C09K 8/64* | (2006.01) | |
| *C09K 8/70* | (2006.01) | |
| *C09K 8/72* | (2006.01) | |

(52) U.S. Cl.
CPC ............... *E21B 43/26* (2013.01); *C09K 8/62* (2013.01); *C09K 8/64* (2013.01); *C09K 8/70* (2013.01); *C09K 8/72* (2013.01)

(58) Field of Classification Search
CPC ........ E21B 43/24; E21B 43/247; E21B 43/26; E21B 43/168; E21B 43/267; E21B 43/166; E21B 43/2405; E21B 43/17; E21B 43/25; C09K 8/80; C09K 8/584; C09K 8/68; C09K 8/60; C09K 8/72; C09K 8/74; C09K 2208/28; C09K 8/36; C09K 8/506; C09K 8/58; C09K 8/64
See application file for complete search history.

(56) References Cited

U.S. PATENT DOCUMENTS

| | | |
|---|---|---|
| 2,838,116 A | 6/1958 | Clark |
| 4,043,395 A | 8/1977 | Every et al. |

(Continued)

FOREIGN PATENT DOCUMENTS

CN   102168545   8/2011

OTHER PUBLICATIONS

United States Environmental Protection Agency Region 5—Underground Injection Control Section Regional Guidance #7 1994.*

(Continued)

*Primary Examiner* — Charles R Nold
(74) *Attorney, Agent, or Firm* — Marc L. Delflache; Jones Delflache LLP

(57) ABSTRACT

The complexity of a fracture network within a subterranean formation may be enhanced by pumping a high breakdown pressure fluid followed by a low breakdown pressure fluid into the formation. The method increases the Stimulated Reservoir Volume (SRV) of the formation and provides for a network of ancillary fractures within the formation.

24 Claims, 14 Drawing Sheets

(56) References Cited

U.S. PATENT DOCUMENTS

| | | |
|---|---|---|
| 4,078,609 A | 3/1978 | Pavlich |
| 4,916,946 A | 4/1990 | Cameron |
| 5,036,919 A | 8/1991 | Thomas et al. |
| 5,111,881 A * | 5/1992 | Soliman et al. ........... 166/250.1 |
| 6,399,546 B1 | 6/2002 | Chang et al. |
| 6,435,277 B1 | 8/2002 | Qu et al. |
| 6,776,235 B1 | 8/2004 | England |
| 6,828,280 B2 | 12/2004 | England et al. |
| 6,881,709 B2 | 4/2005 | Nelson et al. |
| 7,119,050 B2 | 10/2006 | Chang et al. |
| 7,261,160 B2 | 8/2007 | Welton et al. |
| 7,288,505 B2 | 10/2007 | Chang et al. |
| 8,071,511 B2 | 12/2011 | Welton et al. |
| 8,205,675 B2 | 6/2012 | Brannon et al. |
| 8,371,383 B2 | 2/2013 | Bell et al. |
| 8,720,582 B2 | 5/2014 | Brannon et al. |
| 2005/0051328 A1 | 3/2005 | Wilson |
| 2006/0289166 A1 | 12/2006 | Stromquist et al. |
| 2009/0250207 A1 | 10/2009 | May |
| 2009/0260828 A1 | 10/2009 | Kubala et al. |
| 2011/0010097 A1 | 1/2011 | Franquet |
| 2011/0020713 A1 | 1/2011 | Cui et al. |
| 2011/0114318 A1 | 5/2011 | Ezell et al. |
| 2011/0152135 A1 | 6/2011 | Chen et al. |
| 2012/0000662 A1 | 1/2012 | Liskowitz et al. |
| 2012/0024530 A1 * | 2/2012 | Todd et al. ................ 166/308.1 |
| 2012/0125617 A1 * | 5/2012 | Gu et al. ..................... 166/308.1 |
| 2013/0153233 A1 | 6/2013 | Bell et al. |
| 2013/0284438 A1 * | 10/2013 | Dusseault et al. ......... 166/280.1 |
| 2014/0138087 A1 | 5/2014 | Gupta |
| 2014/0299318 A1 | 10/2014 | Crews et al. |
| 2015/0301214 A1 | 10/2015 | Moos |
| 2015/0316048 A1 | 11/2015 | Burnette et al. |
| 2016/0177693 A1 | 6/2016 | Gomaa et al. |

OTHER PUBLICATIONS

EPA Regional Guidance #7; FIG 1.*

F. Guo et al, "Interpretation of Hydraulic Fracturing Breakdown Pressure", International Journal of Rock Mechanics & Mining Sciences, vol. 30, No. 6, Dec. 1, 1993, pp. 617-626.

C. Cipolla et al, "The Relationship Between Fracture Complexity, Reservoir Properties, & Fracture Treatment Design", SPE 115769, Sep. 21-24, 2008, pp. 1-25.

A. Gomaa, "New Insights into Hydraulic Fracturing of Shale Formations", Int'l Petroleum Technology Conference, IPTC 17594, Jan. 20-22, 2014, pp. 1-17.

A. Gomaa, "New Insights into Shale Fracturing Treatment Design", SPE 167754, Feb. 25-27, 2014, pp. 1-15.

PCT Notification of Transmittal of the International Search Report, International Application No. PCT/US2014/021334, dated May 23, 2014.

* cited by examiner 35-pptg guar crosslinked gel 25-pptg guar linear gel

Hydraulic Oil 3 wt% KCl slickwater 3 wt@ KCl slickwater

Nitrogen

METHOD OF ENHANCING THE COMPLEXITY OF A FRACTURE NETWORK WITHIN A SUBTERRANEAN FORMATION

This application claims the benefit of U.S. patent application Ser. No. 61/774,866, filed on Mar. 8, 2013, herein incorporated by reference.

FIELD OF THE DISCLOSURE

The disclosure relates to a method of enhancing the complexity of a fracture network during fracturing of a subterranean formation by pumping a high breakdown pressure fluid followed by a low breakdown pressure fluid in order to increase the Stimulated Reservoir Volume (SRV) within the formation.

BACKGROUND OF THE DISCLOSURE

Shales are fine-grained sedimentary rocks that can be rich sources of petroleum and natural gas. Over the past decade, advances in drilling and completion drilling, such as the combination of horizontal drilling and hydraulic fracturing, have allowed access to large volumes of shale gas and oil that were previously uneconomical to produce. In North America, for example, shale reservoirs such as the Bakken, Barnett, Montney, Haynesville, Marcellus, and most recently the Eagle Ford, Niobrara and Utica shales, are drilled horizontally then completed with multi-stage fracture. These completion techniques may allow for more than 30 stages to be pumped into the horizontal section of a single well. Such multi-stage fracturing techniques have facilitated shale gas and light tight oil production development. The key contributor to the success of such unconventional hydrocarbon development has been increased contact of fracture surface area and formation since productivity from such formations increases with increased fracture surface area. The increased fracture surface area can be achieved by creating maximum complex hydraulic fracturing network.

Currently, in a typical horizontal hydraulic fracturing treatment in shale reservoirs, a slickwater fracturing techniques is used which involves pumping a low-viscosity fluid (such as 3 wt % KCl or fresh water with clay inhibitor and friction reducer) down the wellbore. To maintain proppant transport, rates of 120 bbl/min or higher, may be required. In order to lower surface equipment damage, linear gels may be used to maintain proppant transportation at lower injection rates. At the end of the treatment, a crosslinked gel may be used to create a wide fracture near to the wellbore to reduce the chock effect.

Thus, with current industry practice, fracture fluid viscosity is continuously increasing during the standard shale fracture treatments and the fracture network created is expected to be relatively simple. Multistage fracturing treatment is often required in order to create adequate fracture surface area to produce the hydrocarbon from shale formations economically. Such massive multistage often requires large volume of water and other chemical additives to complete.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved methods and systems which provide for increased productivity of hydrocarbons from low permeability formations, including shale and which have one or more of the attributes or capabilities described or shown in, or as may be apparent from, the other portions of this patent.

SUMMARY OF THE DISCLOSURE

In various embodiments, the present disclosure involves a method of enhancing the complexity of a fracture network during hydraulic fracturing of a subterranean formation penetrated by a well by pumping into the well a first fluid followed by a second fluid, wherein (i) the breakdown pressure due to the first fluid is greater than the breakdown pressure due to the second fluid; (ii) the orientation of the fracture initiated by the first fluid is different from the orientation of the fracture initiated by the second fluid; and (iii) the complexity of the fracture network is enhanced by fractures initiated by the first fluid and fractures initiated by the second fluid.

In some embodiments, the present disclosure involves a method of enhancing the complexity of a fracture network during hydraulic fracturing of a subterranean formation by pumping into a well in successive stages fluids differing in breakdown pressure and enhancing the complexity of the fracture network such that the breakdown pressure due to a first fluid initiates a fracture of a certain orientation and the breakdown pressure due to a second fluid initiates a fracture of a different orientation.

In another embodiment, the present disclosure involves a method of enhancing the complexity of a fracture network during hydraulic fracturing of a subterranean formation by pumping into the well a first fluid and initiating a first fracture and pumping into the well a second fluid and initiating a second fracture, wherein (a) the breakdown pressure due to the first fluid is greater than the breakdown pressure due to the second fluid; (b) the orientation of the first fracture is different from the orientation of the second fracture.

In another embodiment, the present disclosure relates to a method of enhancing the complexity of a fracture network during hydraulic fracturing of a subterranean formation by pumping into a well a fluid having a first defined breakdown pressure, pumping into the well a fluid having a second defined breakdown pressure and successively repeating the pumping steps in order to create a fracture network within the formation, wherein (a) the first defined breakdown pressure is either greater or less than the second defined breakdown pressure and (b) the stimulated reservoir volume is increased after each repetition of the pumping steps.

In another embodiment, the present disclosure is drawn to a method of enhancing the complexity of a fracture network during hydraulic fracturing of a subterranean formation by pumping into the well at least one stage of a first high viscosity fluid at a pressure sufficient to enlarge or initiate a first fracture, pumping into the well at least one stage of a first viscous fluid having a viscosity lower than the viscosity of the high viscosity fluid, and initiating a second fracture, and pumping the pumping steps, wherein the stimulated reservoir volume is greater after each repetitive pumping sequence.

In another embodiment, the present disclosure is drawn to a method of enhancing the complexity of a fracture network within a tight gas formation or a shale formation during hydraulic fracturing. In this embodiment, a first fluid is pumped into a well penetrating the tight gas formation or shale formation. A second fluid is then pumped into the well. The orientation of the fracture initiated by the first fluid is different from the orientation of the fracture initiated by the second fluid. The complexity of the fracture network is enhanced by fractures initiated by the first fluid and fractures initiated by the second fluid.

In another embodiment, the present disclosure involves a method of enhancing the complexity of a fracture network during hydraulic fracturing of a subterranean formation by pumping into a well two fluids. The first fluid pumped into the well may be a gaseous fluid; the second fluid pumped into the well may either be an acid, slickwater, a linear gel or a crosslinked gel.

In another embodiment, the present disclosure involves a method of enhancing the complexity of a fracture network during hydraulic fracturing of a subterranean formation by pumping two separate fluids into a well. The fluids may both be acidic fluids. The concentration of acid in one of the fluids may be different than the acid concentration in the other fluid. Alternatively, the injection rate of one of the acidic fluids may differ from the injection rate of the other acidic fluid. Further, the acid of the fluids may be different.

In another embodiment, the present disclosure relates to a method of enhancing the complexity of a fracture network during hydraulic fracturing of a subterranean formation by into the well two different gaseous fluids. One of the gaseous fluids may be pumped at a different rate into the formation than the other gaseous fluid. Alternatively, the gases of the two fluids may be different.

Accordingly, the present disclosure includes features and advantages which are believed to enable it to enhance the complexity of a fracture network. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1A:
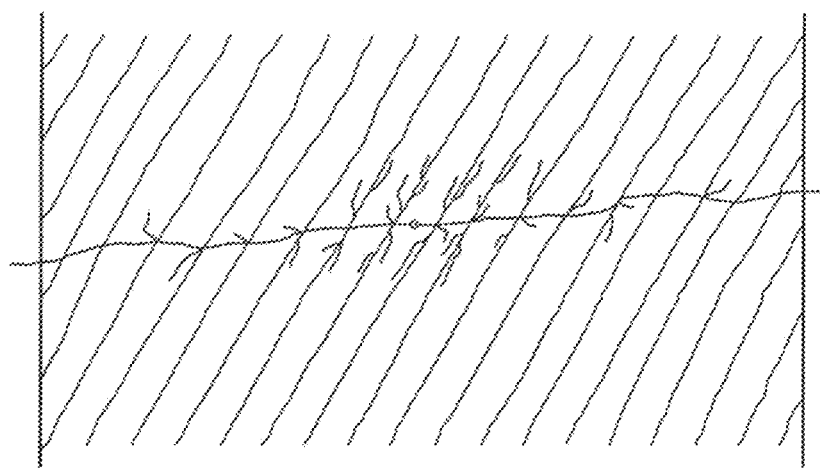
FIG. 1(a) illustrates the fracturing network created by the prior art method wherein slickwater fracturing fluid is continuously injected into the wellbore.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The efficiency of a fracturing process is often measured by the Stimulated Reservoir Volume (SRV) of the formation. SRV is defined as the volume of a reservoir which is effectively stimulated to increase the well performance. The disclosure relates to a method of improving the effectiveness of a hydraulic fracturing operation wherein the complexity of the fracture network is enhanced by increasing the SRV during the process. The increased SRV provides an extended area for migration of hydrocarbons within the formation.

The method has particular applicability to the stimulation of shale formations, carbonate formations, such as limestone, chalk or dolomite as well as subterranean sandstone or siliceous formations in oil and gas wells, including quartz, clay, shale, silt, chert, zeolite, diatomite, or a combination thereof.

In conventional fracturing operations, excessively long primary fracture often results perpendicular to the minimum stress orientation. Typically, pumping of additional fracturing fluid into the wellbore simply extends the planar or primary fracture. In most instances, primary fractures dominate and secondary fractures are limited. Fracturing treatments which create predominately long planar fractures are characterized by a low contacted fracture face surface area, i.e., low SRV. Production of hydrocarbons from the fracturing network created by such treatments is limited by the low SRV.

Figure 1B:
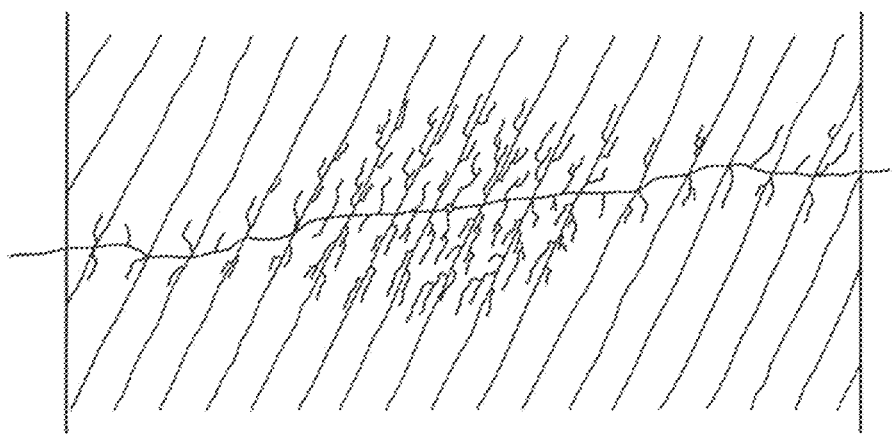
FIG. 1(b) illustrates the fracturing network created by the prior art method wherein a viscous fluid is continuously injected into the wellbore.
Figure 1C:
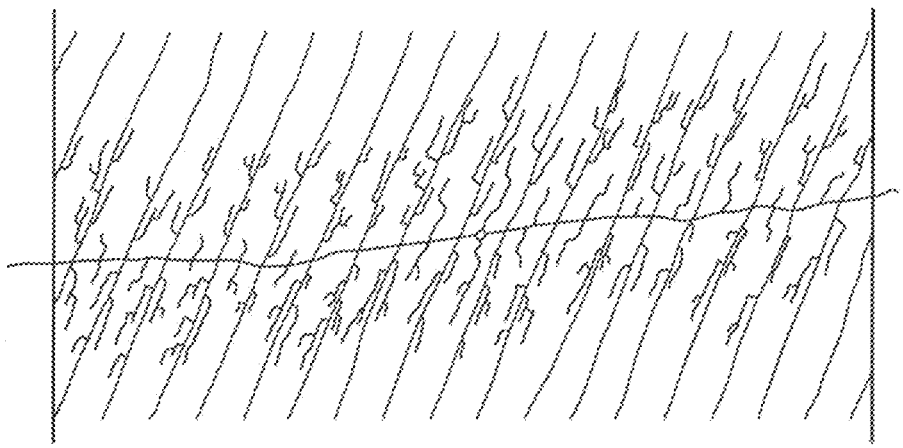
FIG. 1(c) illustrates a complex network of multiple secondary fractures created from near wellbore to far-field by use of the method described herein.

In contrast to conventional fracturing methods which create predominately long planar fractures characterized by frac length not by SRV, the fracturing method disclosed herein provides for ancillary fractures of higher surface area, i.e., higher SRV. The higher SRV may be attributable to the creation of ancillary fractures of differing orientation. Since representative methods defined herein are increased by the creation of fracture networks, the efficacy of the stimulation treatment may be described by a high SRV. The fracturing pattern generated by the method of the invention is illustrated in FIG. 1(c) which demonstrates that excessive primary fracture length may be reduced and well spacing tightened and optimized to maximize recovery and costs. This is in contrast to FIG. 1(a) which represents the fracture pattern generated by the fracturing operation of the prior art wherein slickwater is continuously injected into the wellbore and FIG. 1(b) which represents the fracturing network created by the prior art method wherein a viscous fluid is continuously injected into the wellbore. Thus, the creation of a fracturing network by the method set forth herein increases total surface area of the fractures, thereby increasing the production of hydrocarbons from such formations.

The method is especially useful in the stimulation of low permeability reservoirs, such as shale and tight sandstone formations. Such reservoirs require a large fracture network to maximize well performance. Creation of a fracturing network having an increased total surface area of fractures increases production of hydrocarbons. For such formations, high SRV is more important than high fracture conductivity, the latter being determined by the proppant type and size, fracturing fluid system and placement technique. Because of the low connectivity of such formations, hydrocarbon flow within the formation is very difficult. Therefore, it is desired to reduce the flow distance in the matrix by increasing the fracture network to cover a greater number of locations with the formation. Maximizing the amount of rock with fractures is often accomplished by drilling horizontal wells and placing multiple transverse fracs along the lateral. Reservoir contact may then be optimized by defining the lateral length, the number of stages to be placed in the lateral, the fracture isolation technique and job size.

In an embodiment of the disclosure, the complexity of a fracture network may be enhanced during hydraulic fracturing by pumping multiple stages of fluid into the well. As used herein, the terms "successive stage" and "penultimate stage" refer to a latter and next to latter stages, or a second fluid and a first fluid, respectively. For example, where three stages are employed and when reference is made to the third and second stages, the third stage may be referred to as the "successive stage" and the second stage as the "penultimate stage." Where four stages are employed and when referring to the fourth and third stages, the fourth stage may be referred to as the "successive stage" and the third stage may be referred to as the "penultimate stage," etc. The successive stage may be pumped into the wellbore following a period of time for the fluid of the penultimate stage to flow into the created fracture which results from the penultimate stage.

Between any penultimate stage and successive stage, pumping may be stopped and a pad fluid may be pumped into the reservoir to assist in the creation or enlargement of secondary fractures.

Where a fracturing operation proceeds in multiple stages, the pumping of fluid of a successive stage may a secondary or ancillary fracture off of the fracture created by the penultimate stage. In between each stage, pumping may be stopped for a period sufficient for fluid to flow into the secondary fracture. Each of the secondary fractures created in the formation has a directional orientation distinct from the directional orientation of the fracture from which it extends. In other words, the fracture created from a successive stage has a directional orientation distinct from that of the fracture created from a penultimate stage.

As such, the breakdown pressure is used to guide the sequence of stages in the fracturing of the formation. Breakdown pressure may be defined as the pressure value which causes the rock (the subterranean formation) to fail and initiate a fracture. As used herein, the breakdown pressure due to a fluid refers to the pressure required for the rock to fail and initiate a fracture. Ancillary fractures are caused by varying breakdown pressure due to fluids pumped into the well.

In an embodiment of the disclosure, the complexity of a fracture network may be enhanced during hydraulic fracturing by pumping into a well two fluids providing different breakdown pressures.

A correlation was seen to exist between breakdown pressure and other parameters, such as viscosity, injection rate, the constituency of the fluid such as the presence or absence of an acid, a friction reduction agent, etc., the physical state of the fluid, i.e., a liquid or gaseous state, etc. The complexity of the fracture network may be enhanced during a fracturing operation by monitoring such operational parameters.

In an embodiment, the fluids are pumped in a sequence such that (i) the breakdown pressure due to the first fluid (in a penultimate stage) is greater than the breakdown pressure due to the second fluid (in a successive stage); (ii) the orientation of the fracture initiated by the first fluid is different from the orientation of the fracture initiated by the second fluid; and (iii) the complexity of the fracture network is enhanced by fractures initiated by the first fluid and fractures initiated by the second fluid.

The parameters of the fluids being pumped and the parameters of the pumping stages are dependent on numerous constraints including the type of formation being fractured, the width of the fracture, the pressure which the fluid is pumped, permeability of the formation, etc. Variance in such parameters may be pre-determined in order to provide the requisite breakdown pressure for a given formation.

For instance, lowering the fluid viscosity of the pumping fluid has been seen to lower the breakdown pressure of the formation and provide the ability to produce a complex fracture network composed of many fractures. Increasing the injection rate of the fluid into the formation has been seen to lower the breakdown pressure.

Fracture complexity has been found to increase by reducing the viscosity and/or increasing the acidity of the fluid as stages of fracturing proceed.

Gases and reactive fluids have been found to maximize fracture complexity. Thus, in a preferred embodiment of the disclosure, at least one of the stages is a gas or a reactive fluid. The fluid pumped into the well in different stages may be the same fluid or a different fluid. The viscosity of the first fluid is typically greater than the viscosity of the second fluid or the acidity of the second fluid is greater than the acidity of the first fluid. Alternatively, the acid strength and/or injection rate of the fluids may differ.

In an embodiment, the first fluid pumped into the well may be a gas. The second fluid may be a more viscous fluid, such as an acidic fluid, slickwater, a linear gel or a crosslinked gel.

In another embodiment, the complexity of the fracture network may be enhanced by pumping into the well an acidic first fluid and an acidic second fluid. The concentration of acids in the two fluids may be different. Alternatively, the rate of injection of the two fluids may be different and/or the types of acids used in each of the fluids may be different.

As stated herein, the process disclosed herein may be continuous and may be repeated multiple times throughout the course of the pumping treatment to attain development of a greater fracture area and greater fracture complexity than that which would be attained in the absence of such measures. Thus, it will be appreciated that the desired complex fracturing network may be achieved by a number of stages of fluid being pumped into the formation. For instance, pumping of a low viscosity fluid in a successive stage may follow the pumping of a high viscosity fluid in a penultimate stage; a low injection rate in a successive stage may precede a high injection rate in a penultimate stage, etc. Further, one or more of such operational parameters may be changed from one pumping step to the next pumping stage.

In a preferred embodiment, a low permeability formation may be fractured by first pumping a low viscosity fluid into the formation after the injection of a high viscosity fluid. Fracture propagation thus proceeds in a different direction than that started with the higher viscosity fluid. In other words, the high viscosity fracturing fluid may serve as the blocking agent and the low viscosity fluid may serve as the fracturing fluid in order to create new fracture paths which require lower breakdown pressure. As the low viscosity fluid will require less breakdown pressure to the formation than the high viscosity fluid, it starts to break the formation in a different direction than the high viscosity fluid. This initiates fracture complexity.

During the process, an elevated pressure may remain within the fracture since alternating pumping stages are followed. The alternating of stages in some cases increases leak-off and thus affects the breakdown pressure of the rock. Thus, it may be desirable for repeating stage to be injected wherein each cycle starts with the injection of a stage of low viscosity fluid to initiate fracture followed by injection of high viscosity fluid which requires higher pressure to propagate. Repeating these cycles provides an increased complex fracture network and an increase in SRV.

The fluid defined herein may be gelled or non-gelled or linear or crosslinked. Typically the fluid is gelled by the inclusion of a viscosifying agent such as a viscosifying polymer or viscoelastic fluid. The viscosifying polymer may be a hydratable polymer like, for example, one or more polysaccharides capable of forming linear or crosslinked gels. These include galactomannan gums, guars, derivatized guars, cellulose and cellulose derivatives, starch, starch derivatives, xanthan, derivatized xanthan and mixtures thereof. Specific examples include, but are not limited to, guar gum, guar gum derivative, locust bean gum, welan gum, karaya gum, xanthan gum, scleroglucan, diutan, cellulose and cellulose derivatives such as carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, etc. The viscosifying polymer could be a water hydratable synthetic polymer such as polyacrylamide or copolymer contain polyacrylamide or polyacrylic acid.

The fluid containing the viscosifying polymer may further include a crosslinking agent. Any crosslinking agent suitable for crosslinking the hydratable polymer may be employed. Examples of suitable crosslinking agents include metal ions such as aluminum, antimony, zirconium and titanium-containing compounds, including organotitanates. Examples of suitable crosslinkers may also be found in U.S. Pat. Nos. 5,201,370; 5,514,309; 5,247,995, 5,562,160, and 6,110,875, incorporated herein by reference. Further examples of crosslinking agents are borate-based crosslinkers such as organoborates, mono-borates, poly-borates, mineral borates, etc.

Suitable viscoelastic surfactants may be micellular, such as worm-like micelles, surfactant aggregations or vesicles, lamellar micelles, etc. Such micelles include those set forth in U.S. Pat. Nos. 6,491,099; 6,435,277; 6,410,489; and 7,115,546. Suitable viscoelastic surfactants include cationic, amphoteric and anionic surfactants and are also those set forth in U.S. Pat. Nos. 6,875,728 and 6,410,489, herein incorporated by reference.

In one embodiment, the lower viscosity fluid is slickwater. Slickwater fluids typically do not contain a viscosifying agent but do contain a sufficient amount of a friction reducing agent to minimize tubular friction pressures. Such fluids, generally, have viscosities only slightly higher than unadulterated fresh water or brine.

In another embodiment, the lower viscosity fluid is an acid. Acid fluids may or may not contain a viscosifying agent.

The low or high viscosity fluid may also be "weakly gelled", i.e., having minimum sufficient viscosifying agent or friction reduction agent to achieve friction reduction when pumped down hole (e.g., when pumped down tubing, work string, casing, coiled tubing, drill pipe, etc.), and/or may be characterized as having a viscosifying agent having greater than 0 pounds of polymer per thousand gallons of fracturing fluid.

The low or high viscosity fluid may also be foam fluid, i.e., a fluid having a minimally sufficient amount of foaming agent and gas.

In a preferred embodiment, the sequence of fluid injection is changed from that in conventional fracture treatments where the viscosity of fracture fluid is increased and then decreased in cyclic behavior to create a more complex fracture network.

In a preferred embodiment, at least one of the stages is a gas or a reactive fluid such as a formation dissolving fluid such as an acid or a chelating agent. The fluid pumped into the well in different stages may be the same fluid or a different fluid.

Exemplary stages which may be used in accordance with the breakdown pressure sequencing for the formation are:

Initial Breakdown Fluid: Acid
$1^{st}$ Stage: Gas
2d Stage: Acid
$3^{rd}$ Stage: Slickwater
Initial Breakdown Fluid: Gas
$1^{st}$ Stage: Acid
2d Stage: Slickwater
$3^{rd}$ Stage: Linear gel
Initial Breakdown Fluid: Gas
$1^{st}$ Stage: Gas
2d Stage: Gas
$3^{rd}$ Stage: Gas
Initial Breakdown Fluid: Acid
$1^{st}$ Stage: Slickwater
2d Stage: Gas
$3^{rd}$ Stage: Slickwater
Initial Breakdown Fluid: Acid
$1^{st}$ Stage: Acid
2d Stage: Acid
$3^{rd}$ Stage: Acid
Initial Breakdown Fluid: Acid
$1^{st}$ Stage: Acid
2d Stage: Gas
$3^{rd}$ Stage: Slick water
Initial Breakdown Fluid: Acid
$1^{st}$ Stage: Acid
2d Stage: Gas
$3^{rd}$ Stage: Acid
Initial Breakdown Fluid: Acid
$1^{st}$ Stage: Acid
2d Stage: Gas
$3^{rd}$ Stage: linear gel When used in a stage of the disclosure, the gas may be any gas. The gas within the fluid may be at any volume percent. Typically, gaseous fluids used in the method disclosed herein include nitrogen, carbon dioxide, helium, natural gas, air, liquefied natural gas, condensed natural gas or a mixture of two or more of such gases.

In an embodiment, repetitive stages of gaseous fracturing fluids are desired. At reservoir conditions, such gases may exist as a gas or be in a supercritical phase. Gaseous fluids in a liquid phase or a supercritical phase at inside wellbore conditions improve the hydrostatic pressure during injection. A fluid in a super-critical phase further provides benefit in the transport of proppant into the formation. Further, fluids which are in the gaseous phase at the perforation interval tend to cool down the formation. Gases that are liquefied at the surface (at very low temperature) and which are then injected inside the well further cool down the wellbore and the reservoir formation.

Figure 2:
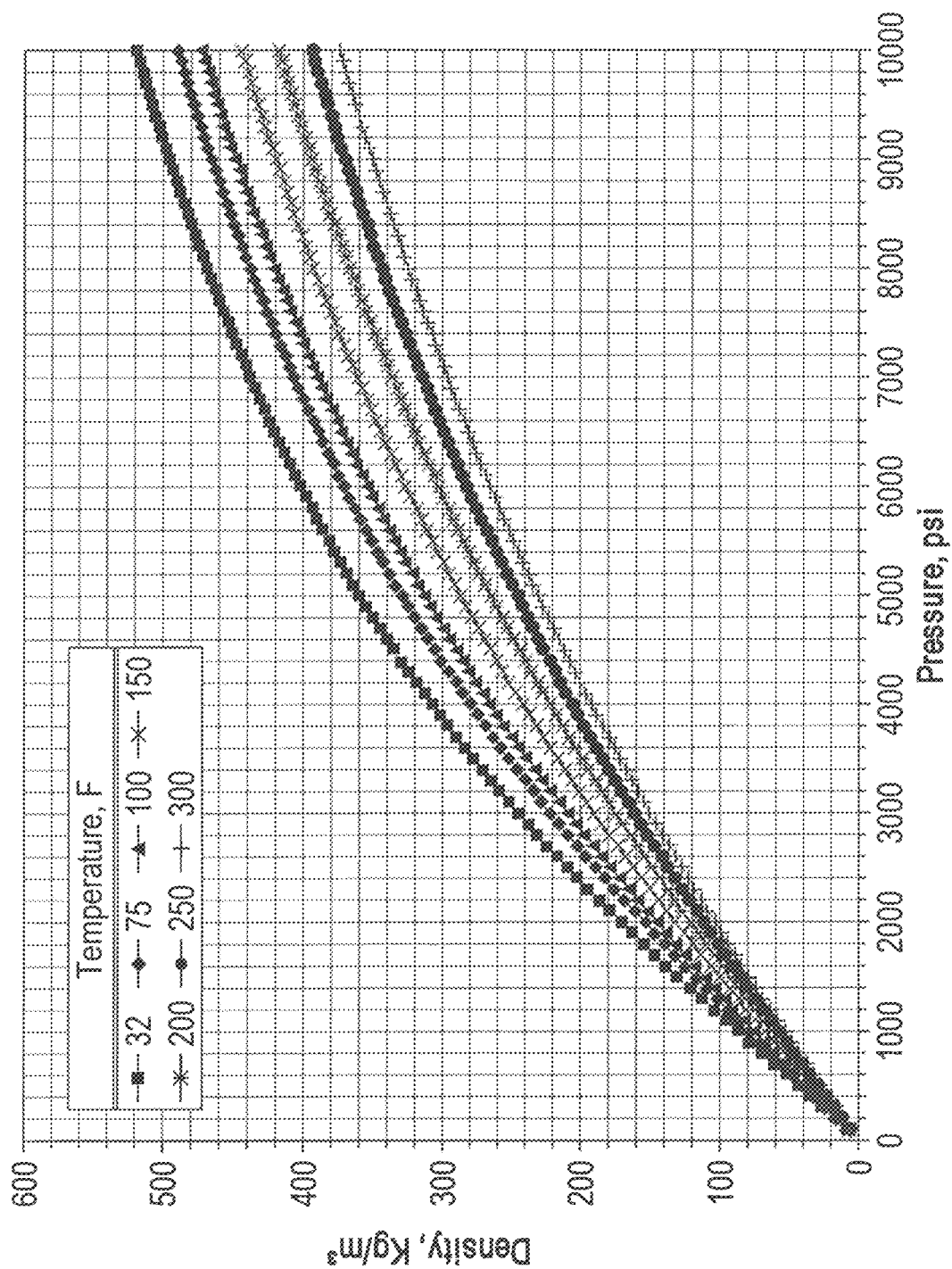
FIG. 2 illustrates the density of nitrogen as a function of temperature and pressure.
Figure 3:
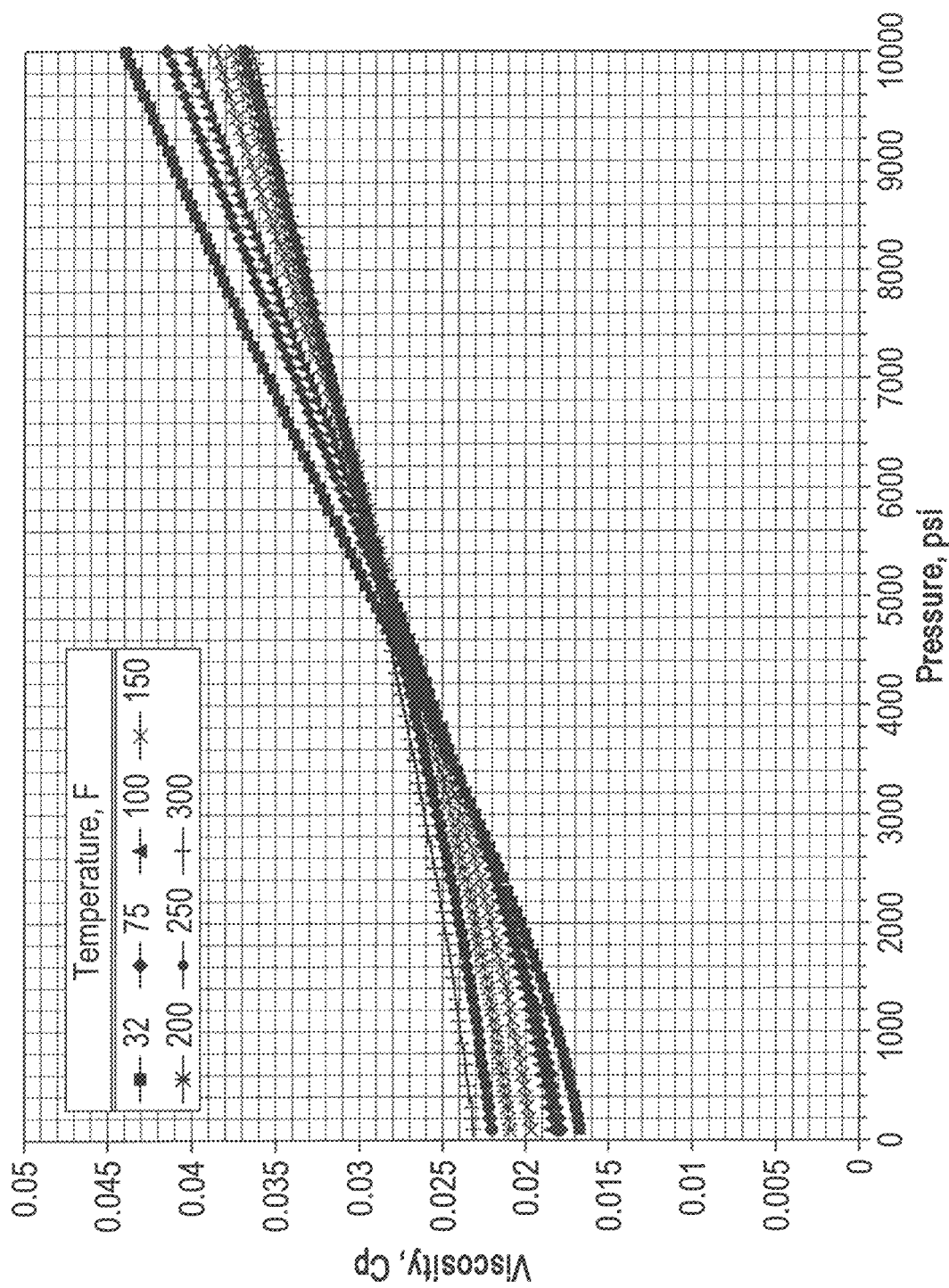
FIG. 3 illustrates the viscosity of nitrogen as a function of temperature and pressure.
Figure 4:
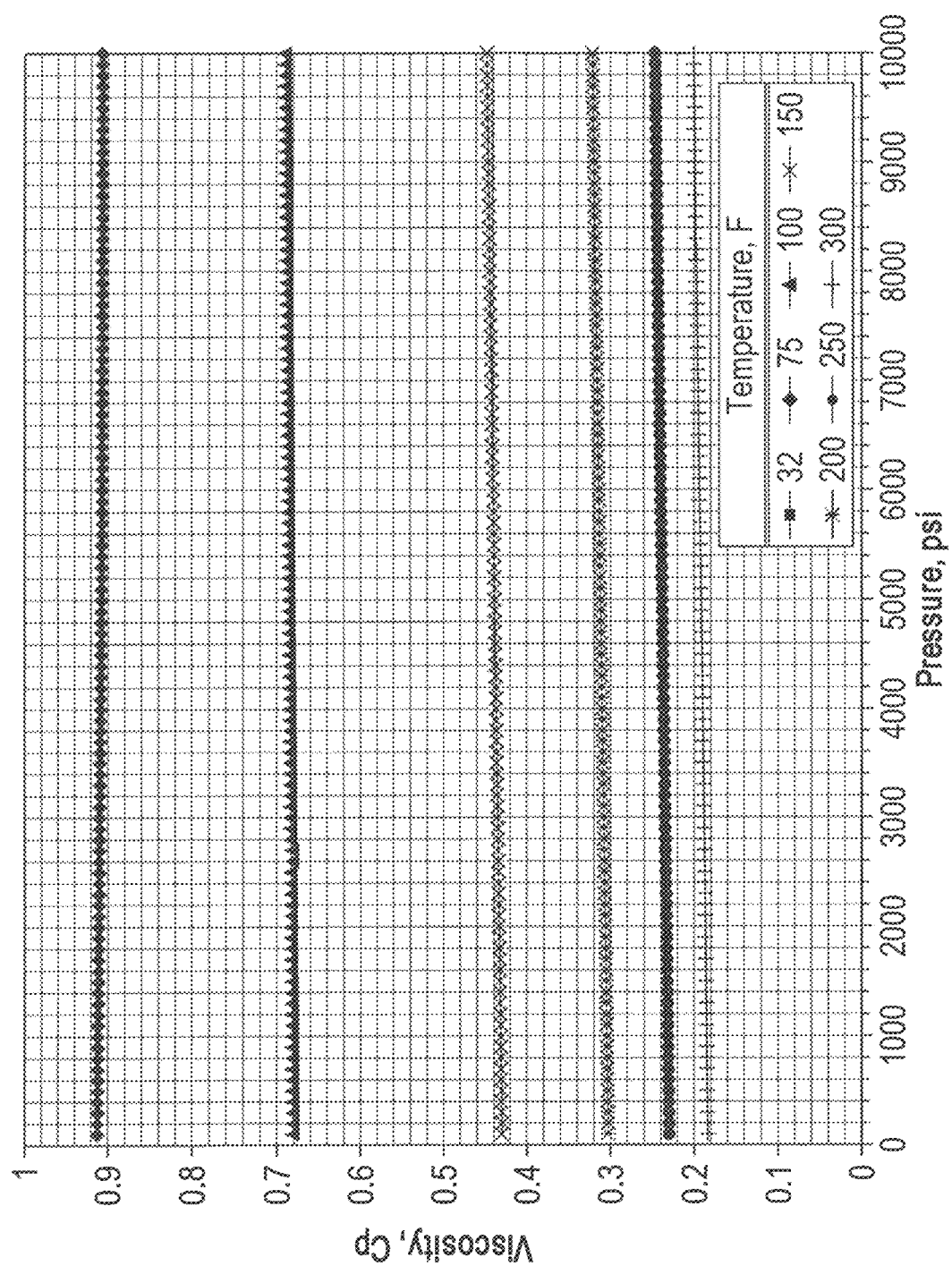
FIG. 4 illustrates the viscosity of water as a function of temperature and pressure.

FIGS. 2, 3 and 4 compare the density of nitrogen (FIG. 2) as a function of pressure (100 to 10,000 psi) and temperature (32° F. to 300° F.), the viscosity of nitrogen (FIG. 3) as a function of pressure (100 to 10,000 psi) and temperature (32° F. to 300° F.); and the viscosity of water (FIG. 4) as a function of pressure (100 to 10,000 psi) and temperature (32° F. to 300° F.). (At test condition, viscosity of water was approximately 1 cP while viscosity of nitrogen was around 0.02 cP.) These figures illustrate the desirability of using nitrogen to breakdown the formation since complex fractures may be created with less pressure. For instance, FIGS. 3 and 4 illustrate that even by increasing the temperature and pressure of nitrogen and moving from gas to supercritical phase, the viscosity of nitrogen is always less than water. As such, nitrogen is able to breakdown low permeability formations, such as shale, at lower pressure than slickwater.

Figure 5:
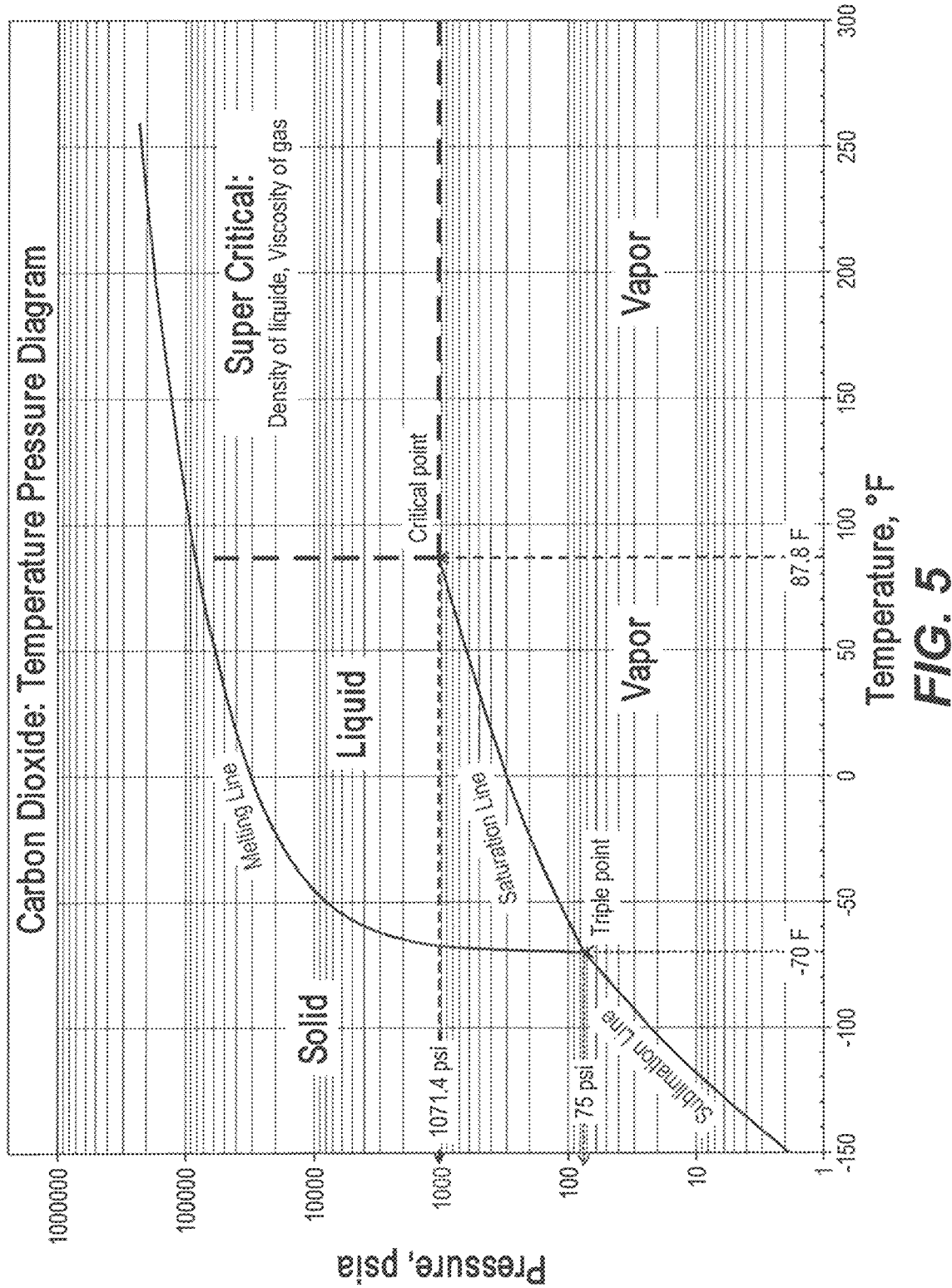
FIG. 5 is a phase diagram for carbon dioxide at varying pressures and temperatures.

FIG. 5 illustrates the phase diagram for carbon dioxide. As illustrated, the supercritical behavior of carbon dioxide exists at a temperature and pressure higher than 87.8° F. and 1071.4 psi. Thus, in nearly all fracturing treatments carbon dioxide exists in a supercritical phase at in-situ reservoir conditions except near the wellbore where the cooling effect of carbon dioxide is dominant when at a liquid phase. This may further cause a thermal shocking to the formation and cause it to break more easily.

The density and viscosity of carbon dioxide as a function of pressure and temperature at liquid, gas, and super-critical phases is set forth in Table I.

TABLE 1

| | $CO_2$ Density, kg/m³ | | | | | | |
|---|---|---|---|---|---|---|---|
| | Pressure, psi | | | | | | |
| Temperature, F. | 500 | 1000 | 2000 | 3000 | 5000 | 7000 | 10000 |
| 0 | 1027.0 | 1042.3 | 1067.2 | 1087.9 | 1122.1 | 1149.8 | 1183.8 |
| 30 | 935.7 | 960.3 | 998.2 | 1027.4 | 1070.1 | 1103.3 | 1142.8 |
| 70 | 79.6 | 785.5 | 885.4 | 935.7 | 997.3 | 1040.3 | 1088.1 |
| 100 | 71.0 | 207.0 | 762.5 | 856.4 | 940.1 | 992.0 | 1047.1 |
| 150 | 61.5 | 146.5 | 486.0 | 697.5 | 838.9 | 910.1 | 979.6 |
| 200 | 54.8 | 122.3 | 324.0 | 532.4 | 735.0 | 828.6 | 913.6 |
| 250 | 50.0 | 108.4 | 261.6 | 429.4 | 642.1 | 752.2 | 851.5 |
| 300 | 45.6 | 96.3 | 214.5 | 342.6 | 552.7 | 677.3 | 790.4 |

| | $CO_2$ Viscosity, cP | | | | | | |
|---|---|---|---|---|---|---|---|
| | Pressure psi | | | | | | |
| Temperature, F. | 500 | 1000 | 2000 | 3000 | 5000 | 7000 | 10000 |
| 0 | 0.143 | 0.150 | 0.161 | 0.172 | 0.193 | 0.212 | 0.214 |
| 30 | 0.110 | 0.115 | 0.128 | 0.139 | 0.158 | 0.175 | 0.200 |

TABLE 1-continued

| | | | | | | | |
|---|---|---|---|---|---|---|---|
| 70 | 0.015 | 0.076 | 0.091 | 0.104 | 0.123 | 0.139 | 0.161 |
| 100 | 0.016 | 0.020 | 0.066 | 0.082 | 0.103 | 0.119 | 0.140 |
| 150 | 0.017 | 0.019 | 0.038 | 0.058 | 0.080 | 0.096 | 0.116 |
| 200 | 0.019 | 0.020 | 0.027 | 0.041 | 0.064 | 0.079 | 0.098 |
| 250 | 0.020 | 0.021 | 0.026 | 0.035 | 0.054 | 0.068 | 0.086 |
| 300 | 0.021 | 0.022 | 0.025 | 0.031 | 0.045 | 0.058 | 0.075 |

As illustrated, the density of carbon dioxide increases with an increase in pressure. Carbon dioxide likely exits the well tubular in a liquid phase with a density similar to water fluids density (may be slightly higher or lower depending on pressure and temperature) in light of the cooling effect of carbon dioxide. This enables the advantage of the using hydrostatic pressure of carbon dioxide to help to fracture low permeability formations.

Further, while the viscosity of carbon dioxide increases with an increase in pressure, viscosity is significantly reduced by temperature. Thus, the viscosity of carbon dioxide in the liquid phase is significantly higher than the viscosity in gas and super-critical phase while the change in viscosity between the gas and super-critical phase is small. The low viscosity of carbon dioxide at its supercritical phase reduces the breakdown pressure of the low permeability formation and further creates a more complex fracture. While the viscosity of liquid carbon dioxide is higher than supercritical carbon dioxide, it is still several times less viscous than the viscosity of slickwater.

Figure 6:
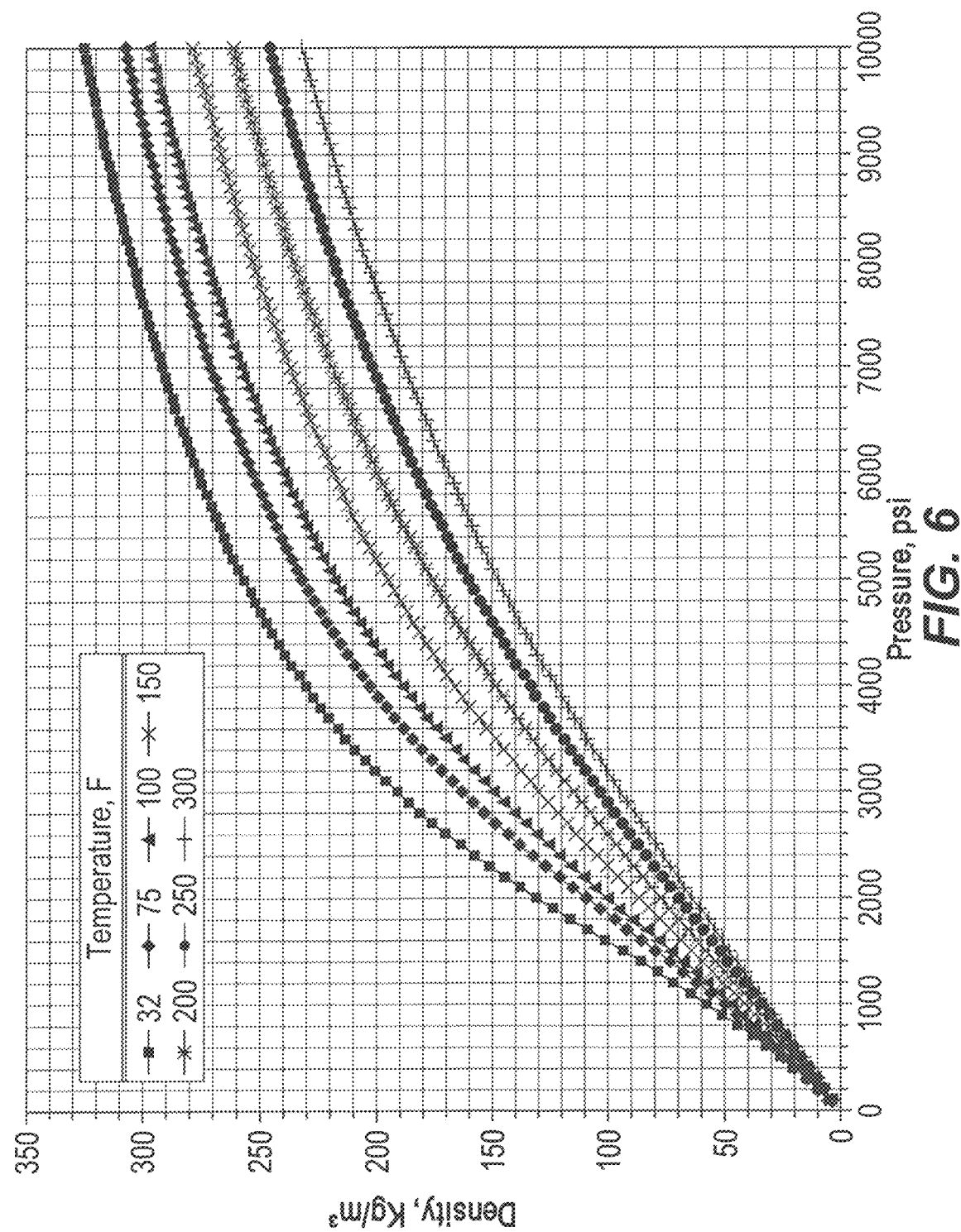
FIG. 6 illustrates the density of methane (LNG) as a function of temperature and pressure.
Figure 7:
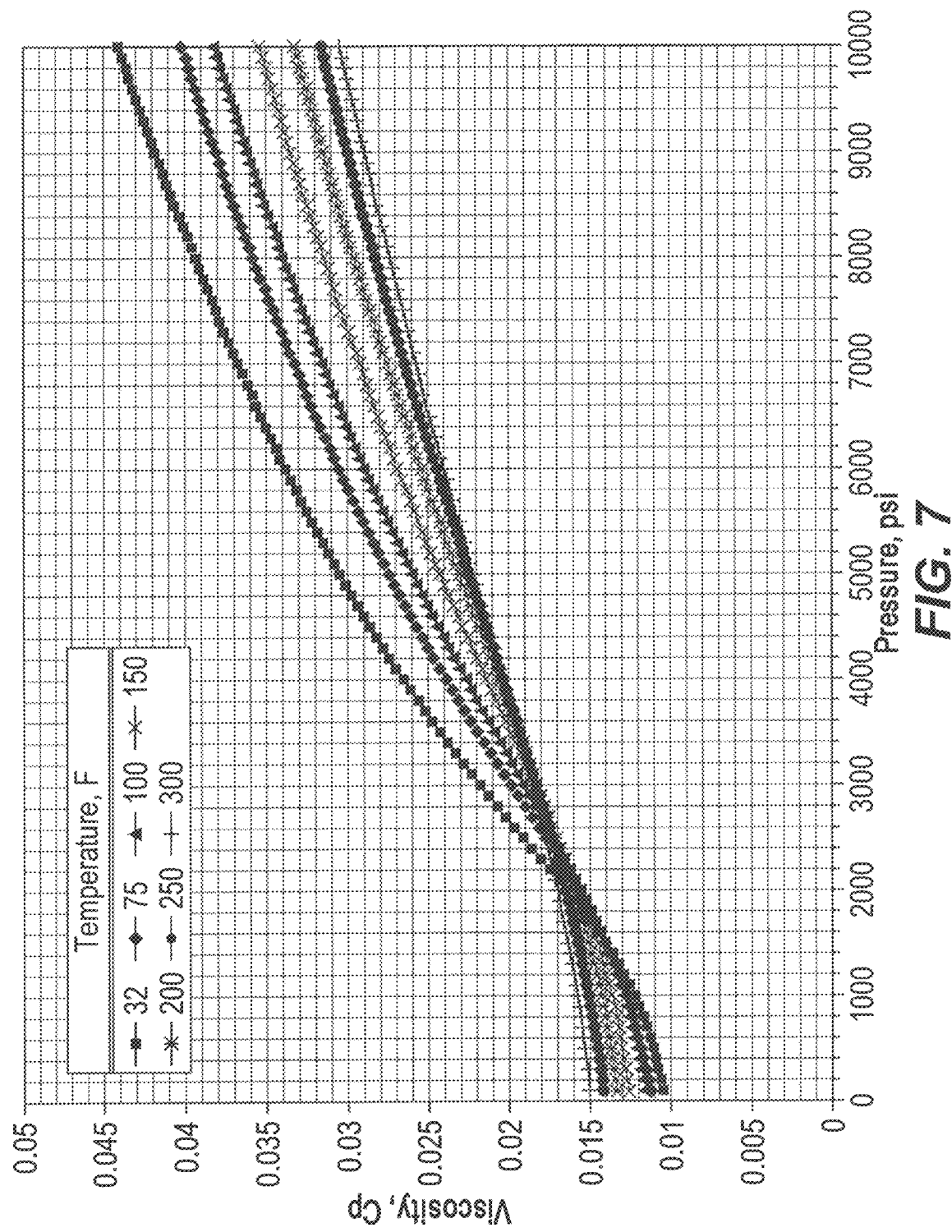
FIG. 7 illustrates the viscosity of methane (LNG) as a function of temperature and pressure.

FIGS. 6 and 7 illustrate the density and the viscosity of methane (represented by LNG) at a temperature range from 32° F. to 300° F. and a pressure range from 100 psi to 10,000 psi, respectively. The viscosity of methane is shown to be less than that of nitrogen. This enables a LNG fluid to exhibit a better ability to break low permeability formations and create more complex fractures than nitrogen.

The use of gaseous fracturing fluids over conventional aqueous based systems is especially desirable in those areas which suffer from a shortage of water or where there is a concern about waste water, the production of flowback waste water, chemical additives or where there are concerns over the compatibility of the formation and the fracturing fluid, such as clay swelling, scale or the formation of emulsions or environmental concerns. Further, where there is concern of damage to the reservoir, gaseous based system are preferred.

In an embodiment, the network of a hydraulic fracture and thus the effectiveness of a fracturing operation may be enhanced, the SRV increased and access to smaller ancillary fractures artificially increased by injecting a reactive fluid into the well which will reduce the breakdown pressure of the formation.

Fracturing fluids containing an acid may have an acid present in the range of from about 0.5 to about 28 vol. %.

Suitable acids include straight inorganic acids (i.e., free of additives), such as HCl, HF, $H_3PO_4$, methanesulfonic acid, etc; straight organic acids (i.e., free of additives), such as formic acid, citric acid, acetic acid, etc); delayed mineral acids; delayed organic acids; retarded mineral acids (such as gelled, viscosified acids, dual-phase acids, etc); retarded organic acids; and chelating agents [such as glutamic acid diacetic acid (GLDA), ethylene diamine tetraacetic acid (EDTA), 1,6-hexandiamine tetraacetic acid (HDTA), etc). Exemplary delayed acids are those wherein the acid is delayed by being generated in-situ such as by the reaction of hydrochloric acid and ammonium bifluoride or ammonium fluoride.

The decrease in pressure to breakdown the formation is attributable to the leaking off of the reactive fluid which thereby creates additional channels before and during fracture initiation and propagation. This breaks the formation behind and in front of the non-reactive fluids and starts fracture propagation in a different direction than offered by a non-reactive fluid. Thus, while the nonreactive fluid serves as a blocking agent, the reactive fluid serves as a fracturing fluid which creates a new fracture path requiring lower breakdown pressure.

Thus, use of a reactive fluid stage (either as a single stage or part of a multi-stage operation) to a conventional sequence of fluid injection in a fracture treatment provides a more complex fracture and a reduction in fracture propagation pressure. Further, by the addition of a reactive fluid stage (one- or multiple stages) to a conventional fracture treatment sequence, a more complex fracture network may be provided with fewer stages. This creates equal or more fracture surface area than conventional multistage fracturing treatment. Thus, the usage of water and chemical additives may be reduced along with the time and cost of the fracturing treatment.

In one embodiment, alternating stages of a liquid fracturing fluid and a gaseous fluid may be injected into the formation in order to break down the formation under different pressure regimes. The conventional liquid based fracture fluid also can help in carrying higher loading of proppants.

In addition to increasing the fracture network, the method disclosed increases proppant transport efficiency. The fluid of low viscosity and/or the fluid of high viscosity may further contain a proppant. The proppant remains in the fracture in the form of a permeable "pack" that serves to "prop" the fracture open. Once the treatment is completed, the fracture closes onto the proppants which maintain the fracture open, providing a highly conductive pathway for hydrocarbons and/or other formation fluids to flow into the wellbore. The fracturing fluid ultimately "leaks off" into the surrounding formation. The treatment design generally requires the fracturing fluid to reach maximum viscosity as it enters the fracture which affects the fracture length and width.

Conventional high-density proppants may be used such as quartz, glass, aluminum pellets, silica (sand) (such as Ottawa, Brady or Colorado Sands), synthetic organic particles such as nylon pellets, ceramics (including aluminosilicates), sintered bauxite, and mixtures thereof. In addition, protective and/or hardening coatings, such as resins to modify or customize the density of a selected base proppant, e.g., ground walnut hulls, etc., resin-coated sand, resin-coated ceramic particles and resin-coated sintered bauxite may be employed. Further, any of the ultra lightweight (ULW) proppants may also be used. Such proppants are defined as having a density less than or equal to 2.45 g/cc, typically less than or equal to 2.25, more typically less than or equal to 2.0, even more typically less than or equal to 1.75. Some ULW proppants have a density less than or equal to 1.25 g/cc. Exemplary of such relatively lightweight proppants are ground or crushed walnut shell material that is coated with a resin, porous ceramics, nylon, etc.

Where the stage contains a gas, particulates having a density less than 1 g/cm$^3$, such as glass beads, are preferred.

The fracturing fluids defined herein may also include chemical treatment agents known in the art, including breakers for enhancing the degradation of or reducing the viscosity of the viscosifying agent in one or more of the stages, scale inhibitors, corrosion inhibitors, stabilizers, etc.

The method disclosed herein provides a more complex fracture network than that expected from fewer stages of the fracturing treatments, which will create equal or more fracture surface area than conventional multistage fracturing treatment. Thus, the process described may provide a reduction in usage of water, chemical additives, as well as a reduction in time and cost of the fracturing treatment, while making hydrocarbon production from low permeability formations economical.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, pumping parameters, features and processes may be employed in any suitable configuration without inclusion of other such components, pumping features and processes. Moreover, the present disclosure includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

All percentages set forth in the Examples are given in terms of weight units except as may otherwise be indicated.

EXAMPLES

Example 1

This Example demonstrates that the creation of fracture complexity has a strong relation with the type of fluid injected into a formation. Mancos and Eagle Ford shale cores with a dimension of 2" diameter by 2" length were tested. The shale cores, having a permeability of approximately 20 nDarcy, were cracked using the experimental illustrated in FIG. 8 wherein a hole of 0.25" diam.×0.75" length was drilled in one face of core 11 in fracturing cell 14. A 0.25" outer diameter tube 13 was placed and fixed inside the hole at a depth of 0.25" leaving an open hole section of 0.5" in length. Fracturing fluid 21 in accumulator 12 was pumped into fracturing cell 14 through first inlet 16 at an injection rate up to 5 ml/min and a maximum injection pressure of 6000 psi using pump 10. The accumulator for the fluid held up to 250 ml. Pressure was introduced into fracture cell 14 through second inlet 18. Pressure was monitored with pressure transducer 20. Gas regulator 24 applied overburden pressure to fluid 23 surrounding sleeve 17 around core 11. The overburden pressure on the fracture breakdown was recorded over time using data acquisition recorder 22.

Figure 9A:
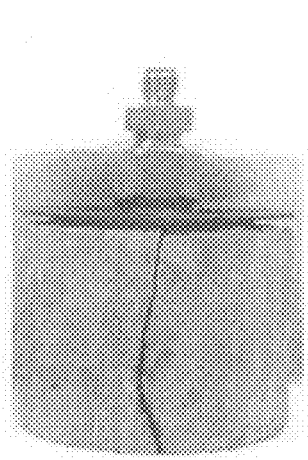
FIGS. 9 (a) through (f) demonstrate the shape of fractures from different types of fracturing fluids.
Figure 9B:
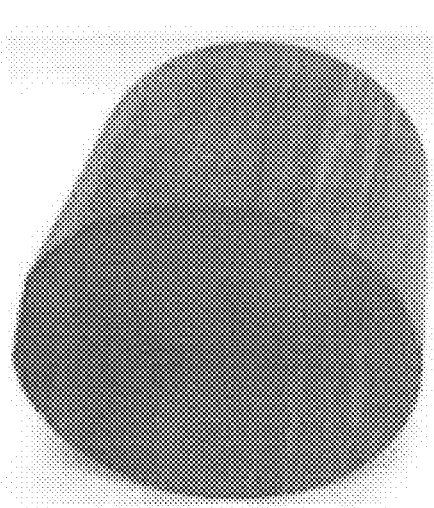
Figure 9C:
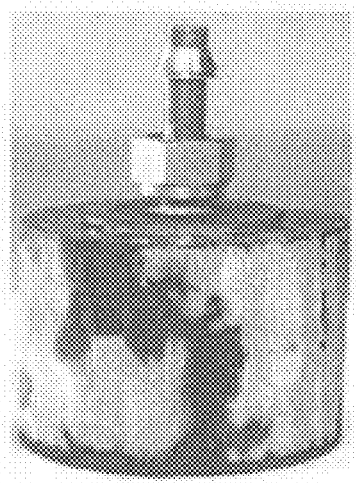
Figure 9D:
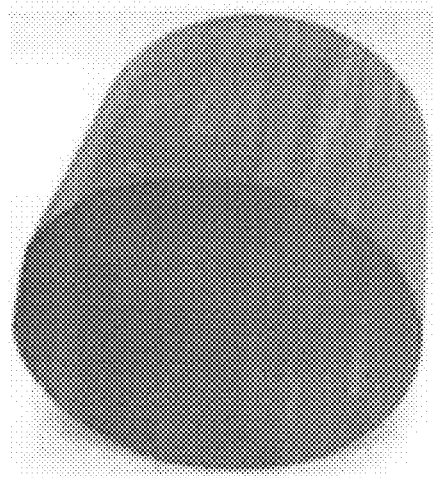
Figure 9E:
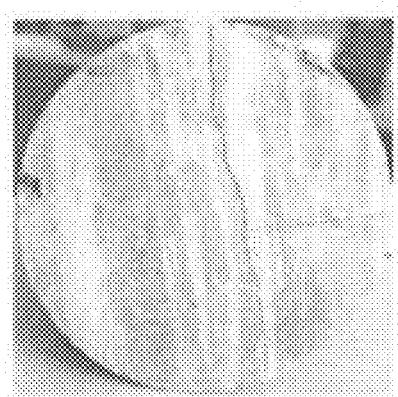
Figure 9F:
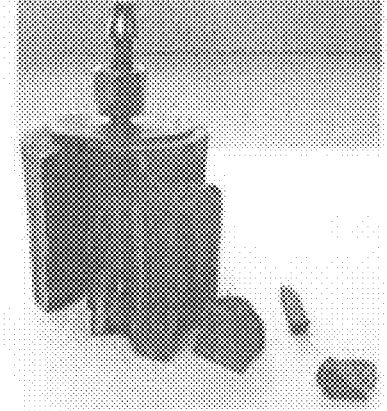
Figure 10:
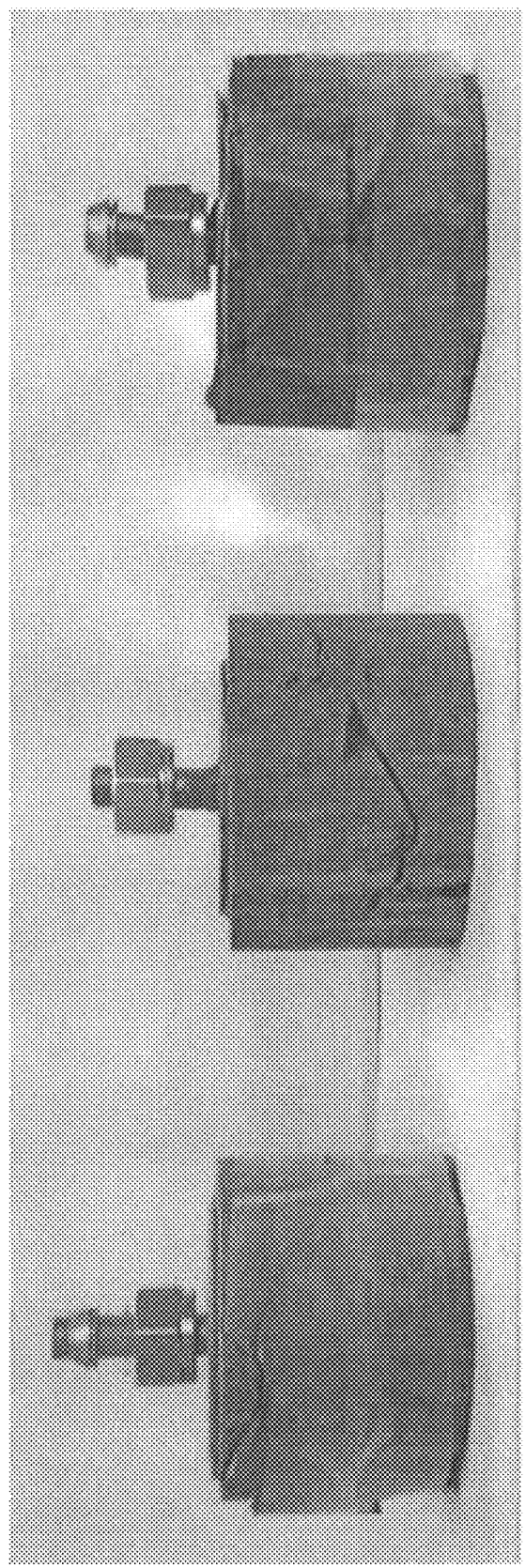
FIG. 10 illustrates the shape of fractures for different core samples after nitrogen injection.

The fracturing fluids pumped into the fracturing cell were (i) a 3 wt. % KCl solution; (ii) a hydraulic oil; (iii) a linear polymer gel containing 35 lbs. of guar; (iv) a crosslinked borate gel containing 35 lbs. of guar; and (v) nitrogen gas. FIGS. 9(a) through 9(f) demonstrate the shape of the fracture created by the different fluid types. FIGS. 9(a) and 9(b) show a typical bi-wing fracture type achieved when the high-viscosity fluids of (iv) for Mancos and (iii) for Eagle Ford were used, respectively. FIG. 9(c) shows the single fracture for Mancos created by use of the hydraulic oil having a viscosity of 10 cP. Unlike a bi-wing fracture, the fracture plane changed with propagation; the fracture surface area from hydraulic being higher than that with the crosslinked and linear gels. FIG. 9(d) and FIG. 9(e) show the fracture shape created by 3 wt % KCl in Eagle Ford and Mancos shale cores, respectively. Multiple fracture planes with higher surface areas were created when 3 wt % KCl was injected in both cores. Finally, FIG. 9(f) shows the complex fractures created by use of nitrogen gas, a ultra-low viscosity fluid. FIG. 10 shows the immediate photo of the core after breakdown using nitrogen at a different location. To confirm the ability of nitrogen to produce complex fractures, the experiment was repeated two additional times. The shapes of the fractures for the three cores after nitrogen injection are shown in FIG. 10 which illustrates complex fractures having been obtained in all cores. The FIGs. further establish fracture design and well performance is significantly impacted by the decision whether to control or exploit fracture complexity.

Example 2

Figure 8:
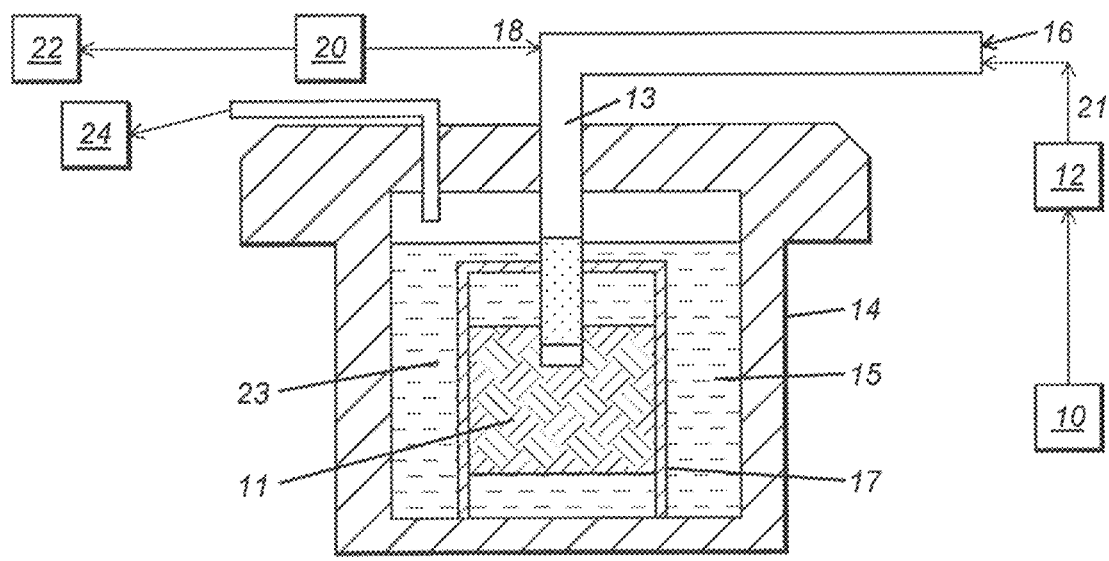
FIG. 8 depicts a testing apparatus for assessing breakdown pressure due to a formation core at in-situ conditions.

The Mancos shale core of Example 1 was cracked using the experimental set-up illustrated in FIG. 8 and described above. Four fluids—3 wt. % KCl solution, hydraulic oil, linear polymer gel containing 35 lbs. of guar, and a crosslinked borate gel containing 35 lbs. of guar—were injected into four different cores with an injection rate of 5 ml/min. and the pressure drop was recorded as a function of time. As each fluid was injected through the core, the injection pressure was continuously increased and the breakdown pressure determined as the pressure when the shale broke.

Figure 11:
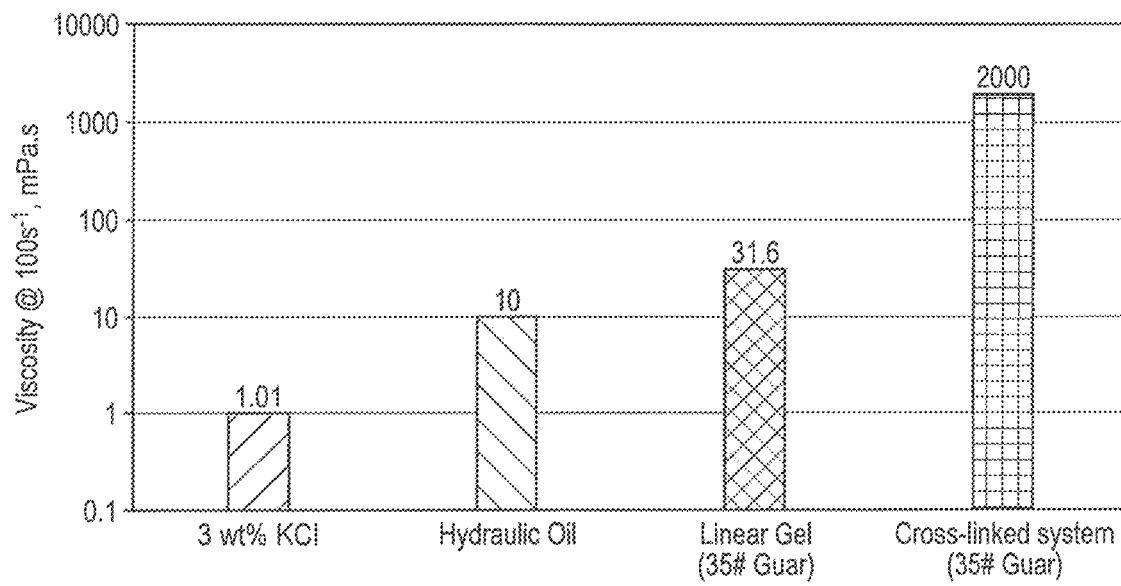
FIG. 11 shows the viscosity of four different fluids.
Figure 12:
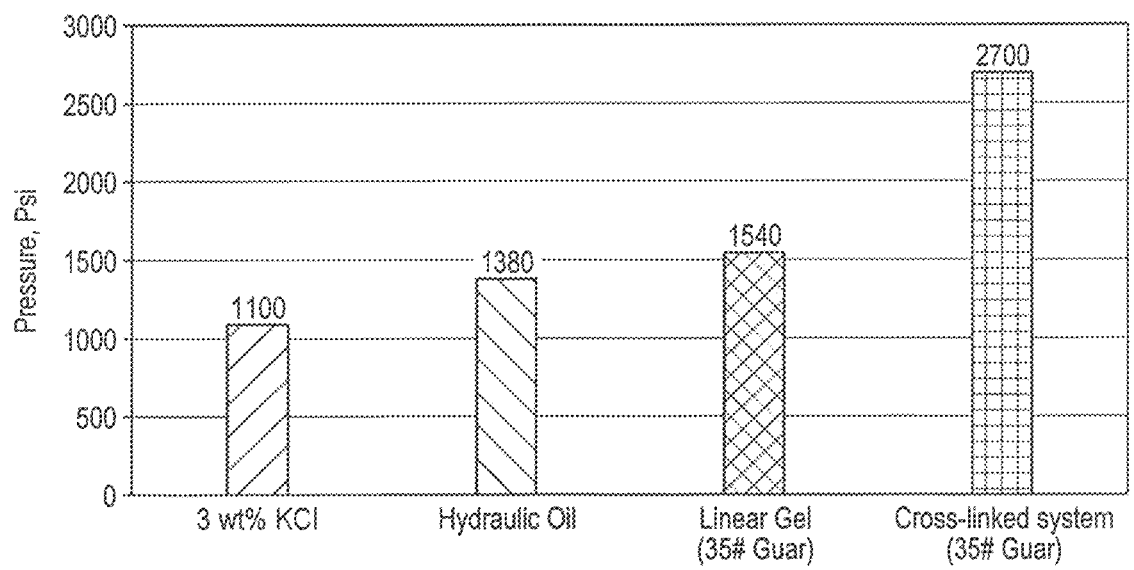
FIG. 12 illustrates the effect of viscosity of the four viscous fluids of FIG. 11 on breakdown pressure due to a shale formation.

FIG. 11 shows the viscosity of the four systems while FIG. 12 shows the breakdown pressure for the four fluids. The Figures illustrate that an increase in fluid viscosity increased the pressure needed to breakdown the formation. The results shown in FIG. 11 and FIG. 12 confirmed that breakdown pressure in shale formation has a strong relationship with the fracture fluid viscosity. A lower fluid viscosity will result in lower pressure needed to breakdown the shale formation while a higher fracture fluid viscosity will require a higher pressure breakdown the shale formation.

Example 3

Figure 13:
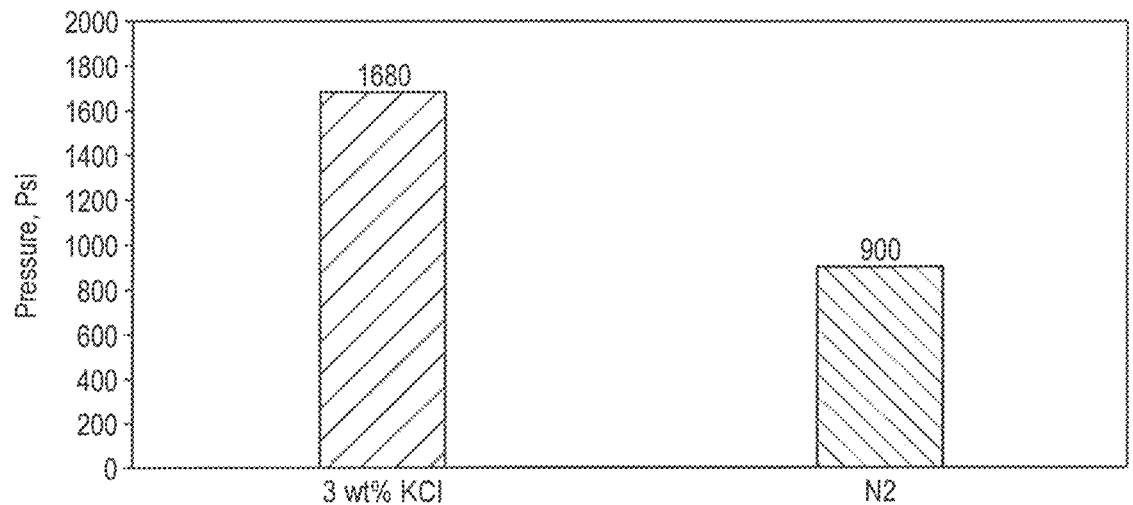
FIG. 13 illustrates the distinctions on breakdown pressure due to a 3 wt. % KCl solution and a low viscosity nitrogen gas.
Figure 14:
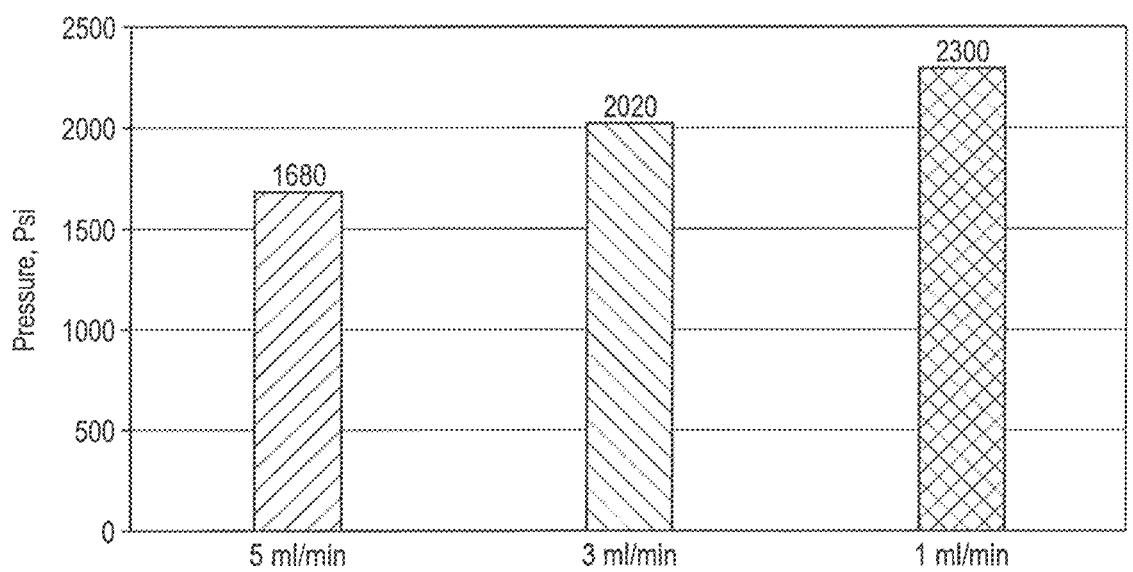
FIG. 14 illustrates the effect of injection rate of a borate crosslinked guar gel on breakdown pressure of a shale formation.

The experimental set-up illustrated in FIG. 8 and discussed in the Example above was equipped with a nitrogen cylinder having a pressure up to 2500 psi and which was connected to the inlet line to allow nitrogen injection. Two experiments were performed to crack each shale core. The first one included injection of a 3 wt. % KCl solution (representing a conventional water fracturing fluid system)

while the second experiment included the injection of nitrogen as the fracturing fluid. The pressure drop was recorded as a function of time. As each fluid was injected through the core, the injection pressure was continuously increased until the shale broke at certain pressure (the breakdown pressure). An increase in the fluid viscosity increased the pressure needed to breakdown the formation. A single fracture was noted from use of the conventional fracturing fluid system. A complex fracture network was observed in all three cores tested with the nitrogen treatment. A clear single fracture was noted from the injection of the KCl solution while a complex fractures were noted when a low viscosity nitrogen gas was used. The distinctions in breakdown pressure are seen in FIG. 13. FIG. 14 shows the shape of fractures for three cores and illustrates the creation of complex fractures using the gas fluid.

Example 4

The effect of injection rate of a borate crosslinked gel containing 35 lbs. guar was tested using the experimental set-up illustrated in FIG. 8 and discussed in Example 1. The gel was testing at a 5 ml/min, 3 ml/min and 1 ml/min injection rate. FIG. 14 illustrates that breakdown pressure increased with decreasing injection rate.

Example 5

Figure 15:
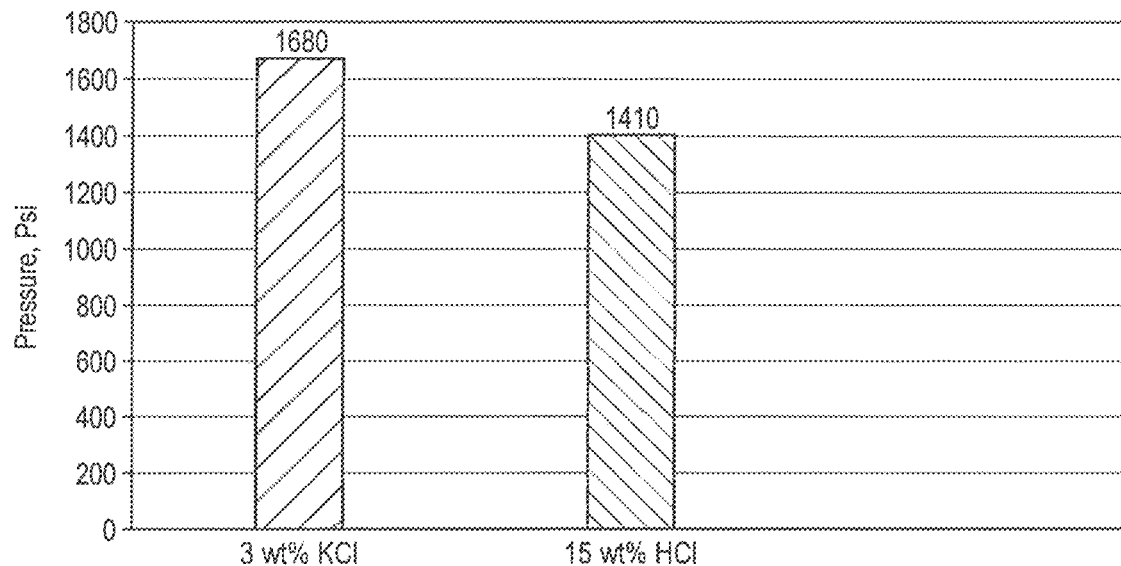
FIG. 15 illustrates the effect on breakdown pressure due to a non-acidic aqueous fluid versus an acidic aqueous fluid.

A correlation was shown to exist in breakdown pressure between an aqueous fluid not containing acid and an acidic aqueous fluid. Using the experimental set-up of FIG. 8, the effects on breakdown pressure between a 3 wt. % KCl solution and a 15 wt. % HCl solution was contrasted at the experimental conditions recited in Example 1. FIG. 15 illustrates that fracture breakdown pressure is lowered by use of an acidic solution. Using the experimental set-up of FIG. 8, the effect on breakdown of a static versus varying injection rates of a 15 wt. % HCl solution was also examined.

Example 6

Figure 16:
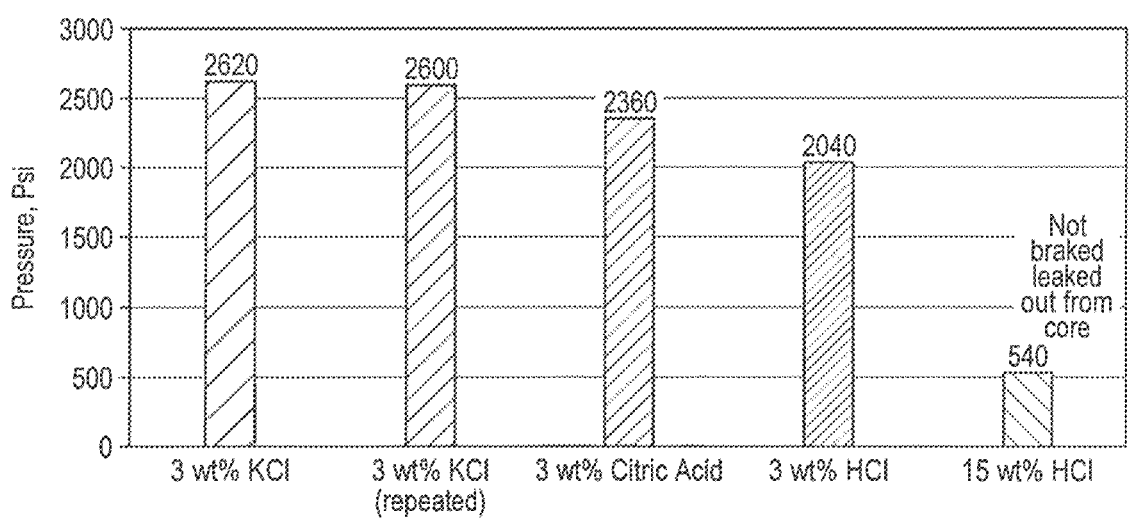
FIG. 16 illustrates the breakdown pressure of four fluids: three reactive acid containing fluids and one non-reactive fluid.

Four different fluids (containing 3 wt % KCl solution, a reactive solution containing 3 wt % citric acid, a reactive solution containing 3 wt % HCl and a reactive solution containing 15 wt % HCl acid) were injected into four different cores with an injection rate of 5 ml/min. pressure drop and recorded as a function of time. As each fluid was injected through the core, the injection pressure was continuously increased until the shale break (the breakdown pressure). FIG. 16 shows the breakdown pressure for the four fluids. FIG. 16 illustrates that increasing the reactivity of fluid increases the pressure needed to breakdown the formation and the breakdown pressure may have a strong relationship with the fracture fluid reactivity. The higher reactive fluid results in a lower pressure needed to breakdown the formation while a lower reactive fracture fluid requires a higher pressure breakdown. Each of the reactive fluids lower than the non-reactive fluids containing KCl.

Example 7

Figure 17:
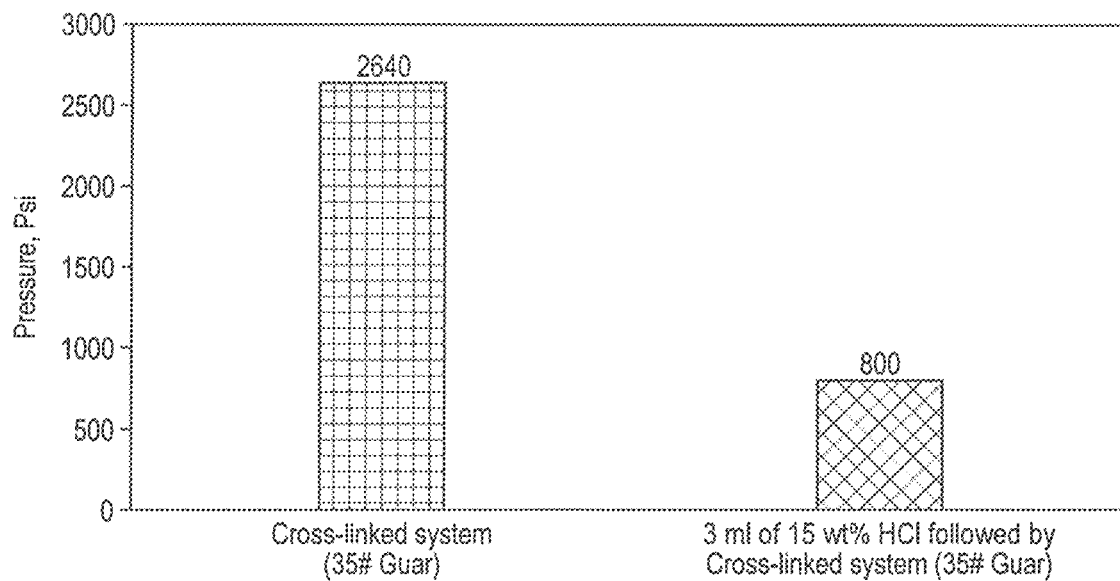
FIG. 17 illustrates the effect on breakdown pressure due to injection into a shale formation of a borate crosslinked guar fluid versus injection of an acidic aqueous fluid followed by a borate crosslinked guar fluid.

Using the experimental set-up of FIG. 8, the effect on breakdown of a borate crosslinked gel containing 35 lbs. of guar versus an aqueous HCl fluid followed by a borate crosslinked gel was examined wherein the maximum pressure and the injection rate were the same as set forth in Example 1. FIG. 17 demonstrates that a greater than three-fold decrease in breakdown pressure was seen with the HCl/borate crosslinked guar fluid compared to the borate crosslinked fluid by itself.

Example 8

Figure 18:
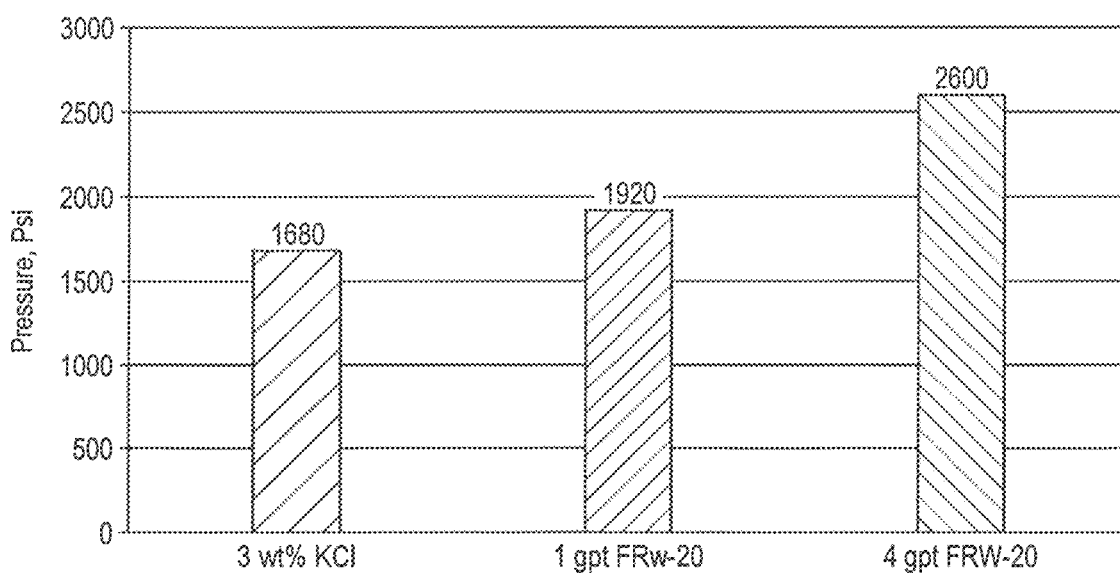
FIG. 18 demonstrates the effect on breakdown pressure of a shale formation by the presence of a friction reduction agent in a fracturing fluid.

Using the experimental set-up of FIG. 8 and the maximum pressure and injection rate of Example 1, the effect of a friction reduction agent was examined. To a 3 wt. % KCl solution, fluids were prepared using 1 gpt of a polyacrylamide friction reduction agent and 4 gpt of the friction reduction agent. FIG. 18 demonstrates that an increase in friction reduction agent increased the breakdown pressure of the core.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of enhancing the complexity of a fracture network during hydraulic fracturing of a subterranean formation penetrated by a well comprising:
    (a) selecting a first fluid having a first viscosity;
    (b) pumping the first fluid into the well at a first breakdown pressure causing a first fracture within the subterranean formation;
    (c) selecting a second fluid having a second viscosity; and
    (d) pumping the second fluid into the well at a second breakdown pressure causing a second fracture within the subterranean formation, the first breakdown pressure being greater than the second breakdown pressure and the first viscosity being greater than the second viscosity,
    wherein a fracture network created by the first fracture is modified by the second fracture, the second fracture deviating from the orientation of the first fracture.

2. The method of claim 1, wherein the subterranean formation is shale.

3. The method of claim 1, wherein at least one of the following conditions prevail:
    (a) the first fluid is a crosslinked gel and the second fluid of lower breakdown pressure is a linear gel;
    (b) the first fluid is a linear gel and the second fluid is slickwater;
    (c) the first fluid is a foam fluid and the second fluid is a gas;
    (d) the first fluid is a crosslinked gel and the second fluid is a gas;
    (e) the first fluid is a crosslinked gel and the second fluid of lower breakdown pressure is slickwater;
    (f) the first fluid is a linear gel and the second fluid is a gas;
    (g) the first fluid of is slickwater and the second fluid is a gas;
    (h) the injection rate of the first fluid is greater than the injection rate of the second fluid;

(i) the first fluid is slickwater and the second fluid contains from about 0.1 to about 28% HCl;

(j) the first fluid and the second fluid of contain an equivalent amount and strength of HCl and further wherein the injection rate of the first fluid is greater than the injection rate of the second fluid;

(k) the first fluid contains a viscosifying agent and the second fluid does not contain a viscosifying agent.

4. The method of claim 1, wherein at least one of the following conditions prevail:

(a) the second fluid is slickwater or a gas;
(b) at least one of the fluids contains a viscosifying agent;
(c) at least one of the fluids is a gas; or (d) at least one of the fluids contains a reactive acid.

5. The method of claim 4, wherein at least one of the fluids contains a viscoelastic surfactant or viscosifying polymer as viscosifying agent.

6. The method of claim 5, wherein the viscosifying polymer is crosslinked.

7. The method of claim 5, wherein the viscosifying agent is a linear gel.

8. The method of claim 5, wherein at least one of the fluids is a gas and wherein the gas is selected from the group consisting of nitrogen, carbon dioxide, natural gas, air, liquefied natural gas, condensed natural gas or a combination thereof.

9. A method of enhancing the complexity of a fracture network during hydraulic fracturing of a subterranean formation penetrated by a reservoir comprising:

(a) selecting and pumping into the well a first fluid having a first viscosity and initiating a first fracture within the subterranean formation;
(b) selecting and pumping into the well a second fluid having a second viscosity and initiating a second fracture within the subterranean formation to create an enhanced complex fracture network wherein:
  (i) the breakdown pressure causing the first fracture within the subterranean formation and due to the first fluid is greater than the breakdown pressure causing the second fracture within the subterranean formation and due to the second fluid and the first viscosity is greater than the second viscosity; and
  (ii) the second fracture deviates from the orientation of the first fracture; and
(c) increasing the stimulated reservoir volume within the formation by the enhanced complexed fracture network.

10. The method of claim 9, wherein the subterranean formation is shale.

11. The method of claim 9, wherein at least one of the following conditions prevail:

(a) the fluid of higher breakdown pressure within the subterranean formation is a crosslinked gel and the fluid of lower breakdown pressure within the subterranean formation is a linear gel;
(b) the fluid of higher breakdown pressure within the subterranean formation is a linear gel and the fluid of lower breakdown pressure within the subterranean formation is slickwater;
(c) the injection rate of the fluid of higher breakdown pressure within the subterranean formation is greater than the injection rate of the fluid of lower breakdown pressure within the subterranean formation;
(d) the fluid of higher breakdown pressure within the subterranean formation is slickwater and the fluid of lower breakdown pressure within the subterranean formation contains from about 0.1 to about 28% HCl;
(e) the fluid of higher breakdown pressure within the subterranean formation and the fluid of lower breakdown pressure within the subterranean formation contain an equivalent amount and strength of HCl and further wherein the injection rate of the fluid of higher breakdown within the subterranean formation is greater than the injection rate of the fluid of lower breakdown pressure within the subterranean formation;
(f) the fluid of higher breakdown pressure within the subterranean formation contains a viscosifying agent and the fluid of lower breakdown pressure within the subterranean formation does not contain a viscosifying agent; or
(g) the fluid of lower breakdown pressure within the subterranean formation is slickwater or a gas.

12. The method of claim 9, wherein at least one of the fluids contains a viscosifying agent selected from the group consisting of viscoelastic surfactants and viscosifying polymers and combinations thereof.

13. A method of enhancing the complexity of a fracture network during hydraulic fracturing of a subterranean formation comprising:

(a) selecting and pumping into a well penetrating the formation a first fluid at a first defined breakdown pressure thereby initiating fractures in the subterranean formation;
(b) selecting and pumping into the well a second fluid at a second defined breakdown pressure thereby initiating secondary fractures off of the fractures initiated in step (a) which generally extend outwardly radially from the well;
(c) successively repeating steps (a) and (b); and
(d) creating a fracture network within the formation wherein:
  (i) the first defined breakdown pressure is either greater or less than the second defined breakdown pressure; and
  (ii) the stimulated reservoir volume is increased after each repetition of step (a) and step (b).

14. The method of claim 13, wherein the subterranean formation is shale.

15. A method of enhancing the complexity of a fracture network within a tight gas formation or shale during hydraulic fracturing of the formation or shale comprising pumping into a well penetrating the tight gas formation or shale a first fluid followed by a second fluid, wherein (i) the viscosity of the first fluid is greater than the viscosity of the second fluid; (ii) the orientation of the fracture initiated by the first fluid is different from the orientation of the fracture initiated by the second fluid; (iii) the breakdown pressure within the subterranean formation due to the first fluid is greater than the breakdown pressure within the subterranean formation due to the second fluid; and (iv) the complexity of the fracture network is enhanced by fractures initiated by the first fluid and fractures initiated by the second fluid.

16. The method of claim 15, wherein the first fluid and the second fluid are reactive acid fluids.

17. The method of claim 15, wherein the first fluid and the second fluid are gaseous fluids.

18. The method of claim 17, wherein the gas is selected from the group consisting of nitrogen, carbon dioxide, natural gas, air, liquefied natural gas, condensed natural gas or a combination thereof.

19. The method of claim 18, wherein the gas is in a supercritical state.

20. The method of claim 15, wherein at the first fluid or the second fluid is a gas or a reactive acid fluid.

21. The method of claim 20, wherein the first fluid or the second fluid is selected from the group consisting of a viscosifying agent or slickwater.

22. The method of claim 21, wherein the viscosifying agent is selected from the group consisting of viscoelastic surfactants, crosslinkable polymers, crosslinked gels or linear gels or a combination thereof.

23. The method of claim 20, wherein the reactive acid fluid is selected from the group consisting of straight inorganic acids, straight mineral acids, straight organic acids, delayed mineral acids, delayed organic acids, retarded mineral acids, retarded organic acids, and chelating agents and mixtures thereof.

24. The method of claim 23, wherein the reactive acid fluid is selected from the group consisting of HCl, HF, $H_3PO_4$, methanesulfonic acid, formic acid, citric acid, acetic acid, gelled, viscosified acids, dual-phase acids, glutamic acid diacetic acid, ethylene diamine tetraacetic acid and 1,6-hexanediamine tetraacetic acid and mixtures thereof.

* * * * *

UNITED STATES PATENT AND TRADEMARK OFFICE
CERTIFICATE OF CORRECTION

PATENT NO. : 10,808,511 B2
APPLICATION NO. : 14/199674
DATED : October 20, 2020
INVENTOR(S) : Ahmed M. Gomaa et al.

Page 1 of 1

It is certified that error appears in the above-identified patent and that said Letters Patent is hereby corrected as shown below:

In the Claims

Column 16, Claim 3(e), Line 53:
Delete "of lower breakdown pressure"

Column 17, Claim 3(j), Line 3:
Delete "of"

Column 18, Claim 13(d)(i), Line 35:
Delete "either"

Column 18, Claim 13(d)(i), Line 36:
Delete "or less"

Signed and Sealed this
Eighth Day of December, 2020

Andrei Iancu
*Director of the United States Patent and Trademark Office*